No. 878,961. PATENTED FEB. 11, 1908.
P. N. JONES.
CONTROLLER FOR ELECTRIC MOTORS.
APPLICATION FILED AUG. 12, 1907.
3 SHEETS—SHEET 1.
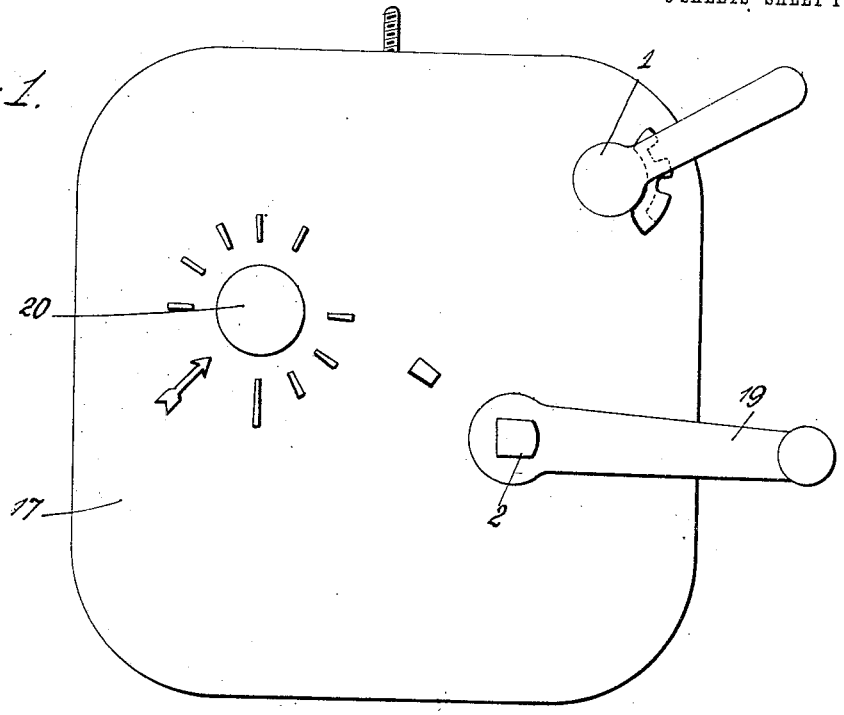
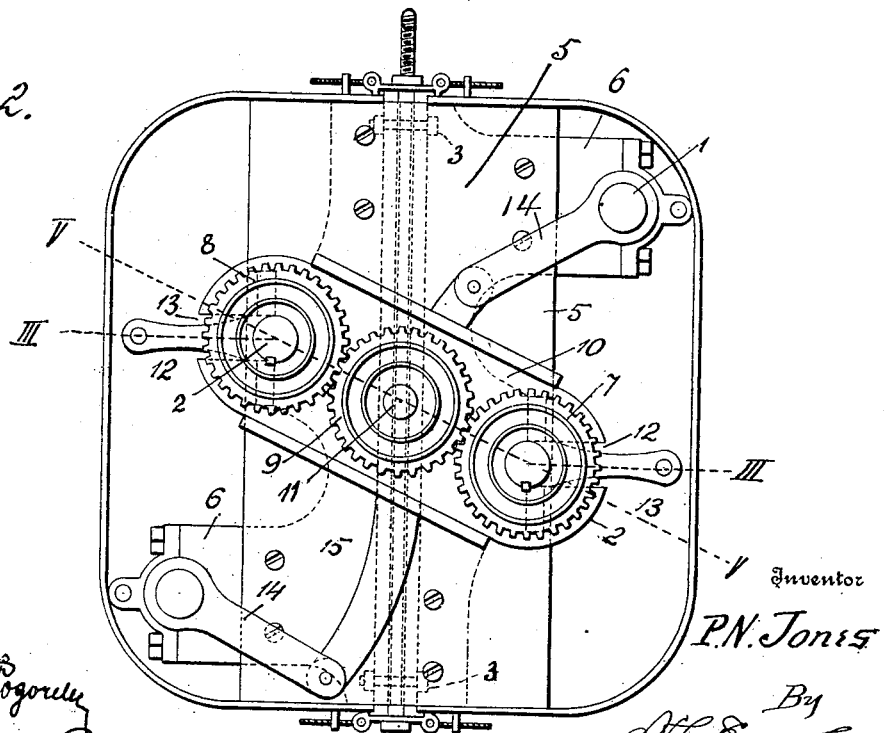

No. 878,961. PATENTED FEB. 11, 1908.
P. N. JONES.
CONTROLLER FOR ELECTRIC MOTORS.
APPLICATION FILED AUG. 12, 1907.

3 SHEETS—SHEET 3.

Witnesses
Emil Pogorely
A. H. Butler

Inventor
P. N. Jones

By H. C. Evert & Co.
Attorneys.

UNITED STATES PATENT OFFICE.

PEARL N. JONES, OF PITTSBURG, PENNSYLVANIA.

CONTROLLER FOR ELECTRIC MOTORS.

No. 878,961.  Specification of Letters Patent.  Patented Feb. 11, 1908.

Application filed August 12, 1907. Serial No. 388,240.

*To all whom it may concern:*

Be it known that I, PEARL N. JONES, a citizen of the United States of America, residing at Pittsburg, in the county of Allegheny and State of Pennsylvania, have invented certain new and useful Improvements in Controllers for Electric Motors, of which the following is a specification, reference being had therein to the accompanying drawing.

This invention relates to controllers for electric motors, and the invention has for its object the combining of two or more controllers with suitable mechanism whereby the controllers can be simultaneously operated to regulate and reverse the current to the motors.

Another object of this invention is to connect one of the members of the controllers to one or more motors, the other member or members to another motor or motors in such a manner that any injury to one set of connections will not impair or affect the operation of the other set of connections.

It is the present practice, especially where heavy grades and traffic are experienced, to equip cars with four motors, one on each axle, and to connect the motors to the contacts on the drum of the controller. It is also the practice to arrange the wires connecting the motors to the controller by a cable extending along one side of the car. This practice is objectionable in case of injury to the controller, by the car being entirely disabled. Further, if a short circuit should occur in the cable, it is almost certain that all wires would be injured as to break connection between all the motors and the controller.

My invention aims to obviate the above defects by providing controllers that can be simultaneously operated and to connect the members of the controllers to one or more motors in such a manner that none of the connections will be injured.

Figure 3:
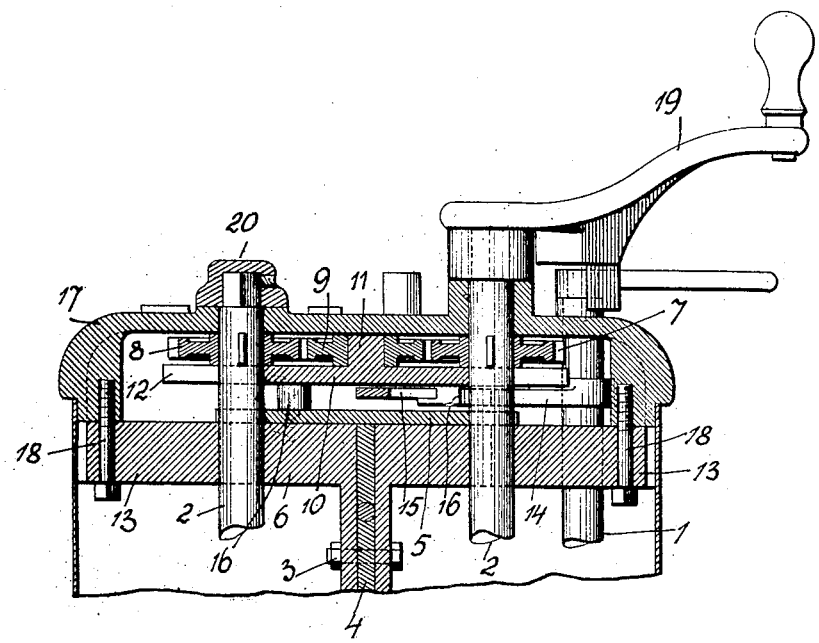
Figure 4:
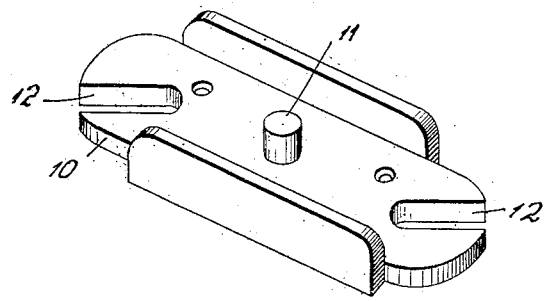
Figure 5:
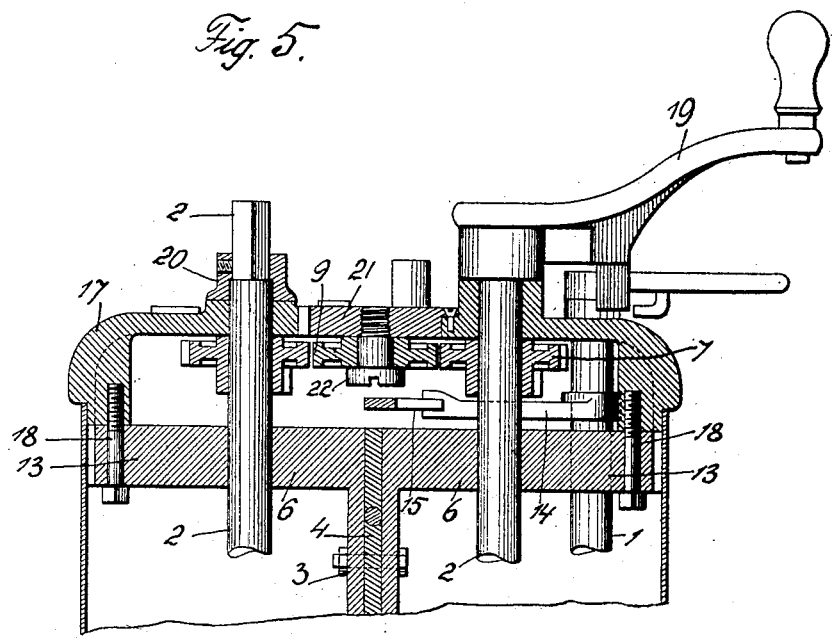
Figure 6:
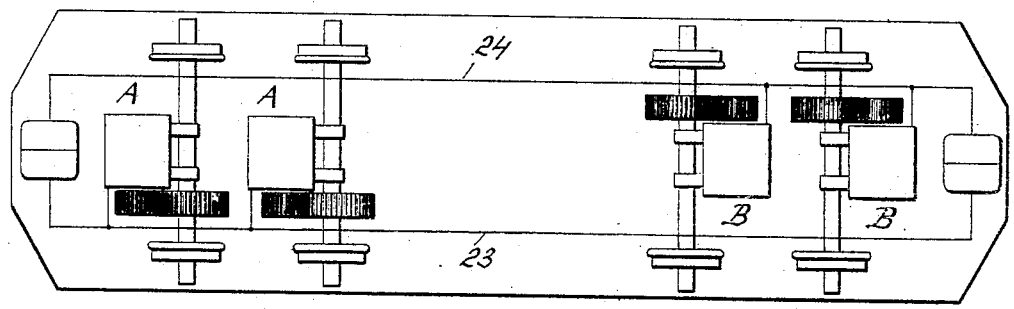

In the drawings forming a part of this specification, Figure 1 is a top plan view of a controller constructed in accordance with my invention, Fig. 2 is a similar view with the cap or cover thereof removed, Fig. 3 is a sectional view on the plane indicated by the line III—III of Fig. 2, Fig. 4 is a detail view of the supporting plate for the transmitting gear, Fig. 5 is a sectional view on the plane indicated by the line V—V of Fig. 2, showing a slight modification of construction to that illustrated in Fig. 3, and Fig. 6 is a diagrammatic view, illustrating electrical connections between the motor and the controllers of a car.

In the practice of my invention two single controllers constructed in the usual or any suitable manner and having the current reversing and regulating shafts 1 and 2, are secured together back to back in any suitable manner, as by bolts 3.

While not necessary, it is preferred to interpose a filling piece or pieces 4 between the back walls of the controlling boxes, said filling piece or pieces being preferably formed of insulating material. It is also desirable to secure the controller boxes together by means of a thin metal plate 5, screwed as shown in Figs. 2 and 3 to the upper face of the controller supporting frames 6. Gear wheels 7 and 8 are mounted on the shafts 2 of the controller drums, said wheels intermeshing with an idler 9. This transmitting gear is supported vertically in the construction shown in Figs. 2 and 3 by a frame 10, which is provided with a stud 11 on which the idler 9 rotates. The shafts 2 extend through slots 12 in the ends of the frame 10, so that by removing the bearing caps 13, the drum can be removed when repairs are necessary. The shafts 1, carrying the reversing switches, are provided with arms 14 connected by a link 15, passing under frame 10, which are held away from the connecting plate 5 or the upper ends of the controller frames 6 by washers 16, as shown in Fig. 3.

A cap or cover 17 is arranged over the combined controllers and is secured in position by bolts 18 or other suitable means. It is preferred that both of the shafts 2 should extend up through the cap or cover, and on one of the shafts is attached an operating handle 19, while the other shaft is desirably provided with a cap 20 which may be provided with a finger adapted to traverse indicating marks on the cap or cover.

In case of the disabling of one of the members of the controllers, the car can be moved by the motors connected to the other member or members of the controller. As at times the injury to one of the members of the controller may be of such character as to prevent the operation of the controller until the mechanical connection between the current regulating members is effected, provision is made for such disconnection.

As shown in Fig. 5 a section 21 of the cap or cover 17 over the idler is made removable so as to permit removal of the idler from operative relation to the other members of the transmitting gear. By thus removing the idler the uninjured member or members of the controller can be operated by a handle on its shaft 2 independent of the other member. In lieu of mounting the idler on a stud carried by the frame 10, it may be mounted on a stud 22 on the cover, and when the cover is formed with a removable section 21, the stud is preferably secured to such removable section as shown in Fig. 5.

The use of two controlling members permits of connecting the motors independently to the controller as shown in Fig. 6. As therein shown the motors A on one truck are electrically connected to one of the controlling members, while the motors B on the other truck have independent electrical connections to the other controlling member. The conductor 23 from the controller to the motors A is separated a considerable distance from and desirably located on the opposite side of the car from the conductor 24 between motors B and the controller, so that injury to one of the conductors, as 23, will not affect the other connection.

It will be readily understood by those skilled in the art that each motor may be connected to a controlling member and that when two or more motors are controlled by a member of the multiple controller, they may be connected to the controller in any desired combination.

Having now described my invention what I claim as new, is:—

1. A controller having in combination a plurality of current regulating members each having a handle and driving connections between said members, comprising a gear wheel for each regulating member, and an idler disposed between the gear wheels of the members and removably-mounted whereby said members may be operated independently when the idler is removed.

2. A controller having in combination a plurality of current regulating members, an idler removably-mounted between the members and normally connecting them, and means for operating the members independently when the idler is removed.

3. The combination of a car, a plurality of motors, a controller having a plurality of current regulating members, means for simultaneously operating said members, connections from one of the regulating members to motors controlled thereby, arranged on one side of the car and connections from the other regulating member to the other motors arranged on the opposite side of the car.

4. A current controller comprising a plurality of current regulating members each operative independently and each having a current regulating shaft, a gear on the shaft of each member, an idler gear mounted between and meshing with the gears on said shafts to effect simultaneous operation of the shafts, the said idler being removably-mounted whereby when disconnected from the gears on the shafts said members may each be operated independently.

5. A current controller having in combination, a plurality of current regulating members each having a current regulating shaft, means for gearing the shafts together whereby the actuation of one shaft of one of said members operates the shaft of the other member, the said means being so mounted as to be shifted out of geared connection to permit independent operation of the members.

6. A current controller having in combination a pair of current regulating members each having a current regulating shaft, means for operating the shafts of said members independently, and means for gearing the shafts together whereby one shaft is operated simultaneously with the operation of the other, the said means being removable whereby the shafts may be operated independently.

In testimony whereof I affix my signature in the presence of two witnesses.

PEARL N. JONES.

Witnesses:
H. K. GOWDY,
MAX H. SROLOVITZ.